(12) United States Patent
Gao et al.

(10) Patent No.: US 9,622,213 B2
(45) Date of Patent: Apr. 11, 2017

(54) MESSAGE NOTIFICATION METHOD AND ELECTRONIC DEVICE

(71) Applicant: Xiaomi Inc., Beijing (CN)

(72) Inventors: Yuan Gao, Beijing (CN); Gaocai Han, Beijing (CN); Lei Zhang, Beijing (CN); Fei Gao, Beijing (CN); Hai Zhao, Beijing (CN); Peng Li, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 14/458,270

(22) Filed: Aug. 13, 2014

(65) Prior Publication Data

US 2015/0173040 A1 Jun. 18, 2015

Related U.S. Application Data

(63) Continuation of application No. PCT/CN2014/077499, filed on May 14, 2014.

(30) Foreign Application Priority Data

Dec. 17, 2013 (CN) .......................... 2013 1 0692608

(51) Int. Cl.
*H04W 4/12* (2009.01)
*H04W 68/02* (2009.01)
*H04W 4/14* (2009.01)

(52) U.S. Cl.
CPC ............. *H04W 68/02* (2013.01); *H04W 4/14* (2013.01)

(58) Field of Classification Search
CPC ................................ H04W 68/02; H04W 4/14

USPC ........................................................ 455/412.2
See application file for complete search history.

(56) References Cited

U.S. PATENT DOCUMENTS

| 2004/0259536 | A1 | 12/2004 | Keshar et al. |
| 2006/0116175 | A1 | 6/2006 | Chu |
| 2008/0229255 | A1* | 9/2008 | Linjama ............ G06F 3/016 715/863 |

(Continued)

FOREIGN PATENT DOCUMENTS

| CN | 101800797 A | 8/2010 |
| CN | 102821199 A | 12/2012 |

(Continued)

OTHER PUBLICATIONS

"International Search Report for PCT/CN2014/077499".
"Extended European search report for 14196325.6".

*Primary Examiner* — Ariel Balaoing
(74) *Attorney, Agent, or Firm* — Jun He Law Offices P.C.; James J. Zhu

(57) ABSTRACT

A message notification method and an electronic device are provided. The message notification method includes: receiving a message by an electronic device; detecting whether a screen of the electronic device is in an unobservable state when the message is received, the unobservable state indicating that the screen of the electronic device is downward or covered; and controlling a message notification assembly configured at a non-screen side of the electronic device to generate a visual prompt if the screen of the electronic device is in the unobservable state. Thus, the user can be notified to read or answer the received messages even if the electronic device is in the silent mode and the screen is in the unobservable state.

15 Claims, 5 Drawing Sheets

(56) References Cited

U.S. PATENT DOCUMENTS

| | | | |
|---|---|---|---|
| 2011/0319141 A1 | 12/2011 | Miwa | |
| 2012/0023171 A1* | 1/2012 | Redmond | H04M 1/7253 709/205 |
| 2013/0054706 A1* | 2/2013 | Graham | H04M 19/04 709/206 |
| 2013/0100017 A1* | 4/2013 | Papakipos | H04W 52/0264 345/158 |
| 2013/0178248 A1* | 7/2013 | Kim | H04M 1/0268 455/566 |
| 2014/0300533 A1* | 10/2014 | Cho | G06F 3/041 345/156 |

FOREIGN PATENT DOCUMENTS

| | | |
|---|---|---|
| CN | 102957810 A | 3/2013 |
| CN | 103067591 A | 4/2013 |
| CN | 103428326 A | 12/2013 |
| CN | 103701988 A | 4/2014 |
| EP | 2363776 A1 | 9/2011 |
| JP | 2002111808 A | 4/2002 |
| JP | 2007-250591 A | 9/2007 |
| JP | 2008035429 A | 2/2008 |
| JP | 2008225453 A | 9/2008 |
| JP | 2012205077 A | 10/2012 |
| JP | 2013168715 A | 8/2013 |
| KR | 10-2012-0104242 A | 9/2012 |
| RU | 2005138319 A | 5/2006 |
| WO | 2012/044202 A2 | 4/2012 |

* cited by examiner

MESSAGE NOTIFICATION METHOD AND ELECTRONIC DEVICE

CROSS REFERENCE TO RELATED APPLICATIONS

This application is a Continuation of International Application No. PCT/CN2014/077499 with an international filing date of May 14, 2014, which is based upon and claims priority to Chinese Patent Application No. 201310692608.0, filed on Dec. 17, 2013, the entire contents of which are incorporated herein by reference.

TECHNICAL FIELD

The present disclosure generally relates to the field of mobile terminal, and more particularly, to a message notification method and an electronic device thereof.

BACKGROUND

With the popularity of electronic devices such as mobile phones and tablet PCs, these electronic devices become critical to people's daily work and life. These electronic devices can provide voice messaging services, or information receiving and sending services.

Taking the mobile phone as an example, when a call comes in, the mobile phone will play a music or a ringtone to notify the user to answer the call if it is in a normal mode; and the mobile phone will vibrate to notify the user to answer the call if it is in a vibration mode. However, if the mobile phone is in a silent mode, a screen of the mobile phone may light up, but the mobile phone may not generate any sound or vibration to notify the user to answer the call.

Therefore, when an electronic device is in the silent mode and the screen is in an unobservable state, the electronic device is unable to notify the user to read received messages.

SUMMARY

Accordingly, the embodiments of the present disclosure provide a message notification method and an electronic device thereof.

According to a first aspect of embodiments of the present disclosure, there is provided a message notification method, including: receiving a message by an electronic device; detecting whether a screen of the electronic device is in an unobservable state when the message is received, the unobservable state indicating that the screen of the electronic device is downward or covered; and controlling a message notification assembly configured at a non-screen side of the electronic device to generate a visual prompt if the screen of the electronic device is in the unobservable state.

According to a second aspect of embodiments of the present disclosure, there is provided an electronic device, including: a screen; a memory for storing instructions executable by the one or more processors; and wherein the one or more processors are configured to execute instructions for: receiving a message; detecting whether the screen of the electronic device is in an unobservable state when the message is received, the unobservable state indicating that the screen of the electronic device is downward or covered; and controlling a message notification assembly configured at a non-screen side of the electronic device to generate a visual prompt if the screen of the electronic device is in the unobservable state.

According to a third aspect of embodiments of the present disclosure, there is provided a non-transitory computer-readable storage medium having stored therein instructions that, when executed by one or more processors of an electronic device, cause the electronic device to perform: receiving a message by an electronic device; detecting whether a screen of the electronic device is in an unobservable state when the message is received, the unobservable state indicating that the screen of the electronic device is downward or covered; and controlling a message notification assembly configured at a non-screen side of the electronic device to generate a visual prompt if the screen of the electronic device is in the unobservable state.

The technical solutions according to the embodiments of the present disclosure may have the following benefits. When a message is received, it is detected whether the screen of the electronic device is in the unobservable state: if it is detected that the screen is in the unobservable state, for instance, the mobile phone is reversed (i.e., the screen of the mobile phone is downward), the message notification assembly configured at non-screen side of the electronic device is controlled to generate and display the visual prompt. Therefore, the problem existing in the related art, i.e. that the user can not be notified to read or answer the received messages when the electronic device is in the silent mode and the screen is in the unobservable state, can be solved.

It will be appreciated that both the foregoing general description and the following detailed description are exemplary and illustrative only and are not restrictive of the invention, as claimed.

BRIEF DESCRIPTION OF THE DRAWINGS

The accompanying drawings, which are incorporated into and constitute a part of the present disclosure, illustrate the embodiments in conformity with the present disclosure and together with the specification serve to explain the principles of the invention.

Specific embodiments in this disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art with reference to particular embodiments.

DETAILED DESCRIPTION

In order to make the purposes, technical solutions and advantages of the present disclosure more apparent, the present disclosure will be further described in detail below with reference to the accompanying drawings. It is apparent that the described embodiments are only a part of embodiments of the present disclosure, but not all the embodiments. All the other embodiments obtained by the person skilled in the art based on the embodiments in the present disclosure without inventive labor fall within the protection scope of the present disclosure.

Figure 1:
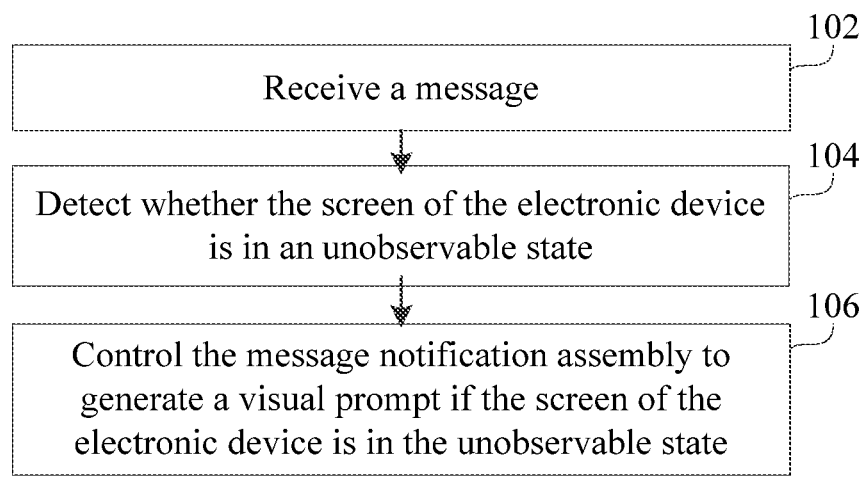
FIG. 1 is an exemplary method flow chart of a message notification method according to an exemplary embodiment of the disclosure.

Referring to FIG. 1, which illustrates an exemplary flow chart of a message notification method according to an embodiment of the present disclosure. The message notification method may include the following steps.

In Step 102, a message is received by an electronic device.

The electronic device has a screen side with a screen, and a non-screen side with a message notification assembly. The non-screen side is opposite or adjacent to the screen side. For example, the screen side is a front side of an electronic device (such as mobile phone or pad) with the screen embedded in the front side, and the non-screen side is a back side of the electronic device. The electronic device receives the message which may be a call, a short message (SMS), a multimedia message (MMS), an E-mail, information, a tip, or the like.

In Step 104, when the message is received, it is detected whether the screen of the electronic device is in an unobservable state.

When the message is received, the electronic device detects whether its screen is in the unobservable state. The unobservable state may be a state that the screen is facing downward with or without an inclined angle with respect to the vertical direction. Alternatively, the unobservable state may be a state that the screen is covered, for example, the electronic device stands upright with its screen in contact with a wall.

In Step 106, if it is detected that the screen is in the unobservable state, a message notification assembly configured at the non-screen side of the electronic device is controlled to generate a visual prompt.

The electronic device further includes the message notification assembly. When it is detected that the screen is in the unobservable state, the electronic device controls the message notification assembly to generate the visual prompt. The message notification assembly is configured at a non-screen side of the electronic device which does not have the screen, such as at a rear cover of the electronic device opposite to a front side of the electronic device, or at a lateral side of the electronic device adjacent to the front side. The visual prompt may be flash light, continuous light or the like.

In summary, the message notification method according to the present embodiment detects whether the screen of the electronic device is in the unobservable state when receiving the message. If it is detected that the screen is in the unobservable state, the message notification assembly configured at the non-screen side of the electronic device is controlled to generate and display the visual prompt. Moreover, in some exemplary embodiments, the message notification assembly may further generate an audio prompt with the visual prompt. Therefore, the problem existing in the related art, i.e. that the user can not be notified to read or answer the received messages when the electronic device is in the silent mode and the screen is in the unobservable state, can be solved.

Figure 2A:
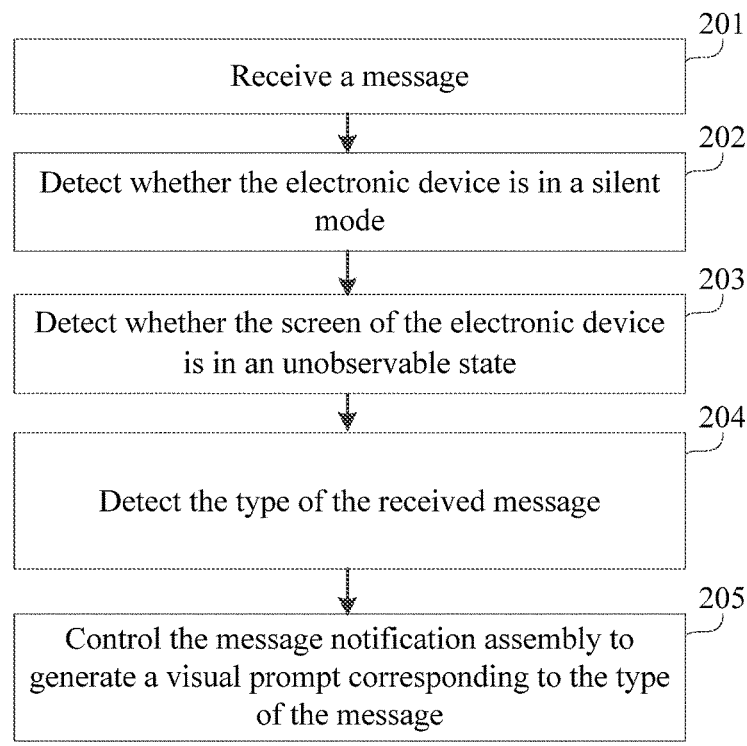
FIG. 2A is an exemplary method flow chart of a message notification method according to an exemplary embodiment of the disclosure.

Referring to FIG. 2A, which illustrates an exemplary flow chart of a message notification method according to another embodiment of the present disclosure. The message notification method may include the following steps.

In Step 201, a message is received by an electronic device.

The electronic device receives the message, and the message may include a call, a short message, a multimedia message, an E-mail, a piece of information, or a prompt.

In Step 202, when receiving the message, it is detected whether the electronic device is in a silent mode.

When receiving the message, the electronic device may detect whether it is in the silent mode. If it is detected that the electronic device is not in the silent mode, the user may be notified to receive messages by playing music or ringtone, or may be notified to receive messages in form of vibration. If it is detected that the electronic device is in the silent mode, the message notification method according to the present disclosure is used to notify the user to answer the received message. For instance, if it is detected that the electronic device is in the silent mode, the following Step 203 will be performed.

In Step 203, if it is detected that the electronic device is in the silent mode, the electronic device further detects whether the screen of the electronic device is in an unobservable state.

The electronic device continues to determine whether its screen is in the unobservable state. The unobservable state may be a state that the screen is facing downward with or without an inclined angle with respect to the vertical direction. Alternatively, the unobservable state may be a state that the screen is obscured, for example, the electronic device stands upright with its screen in contact with a wall.

In a first example, the electronic device has a built-in gravity sensor such as an accelerometer. Then the electronic device can detect whether its screen is downward based on data collected by the built-in gravity sensor.

Figure 2B:
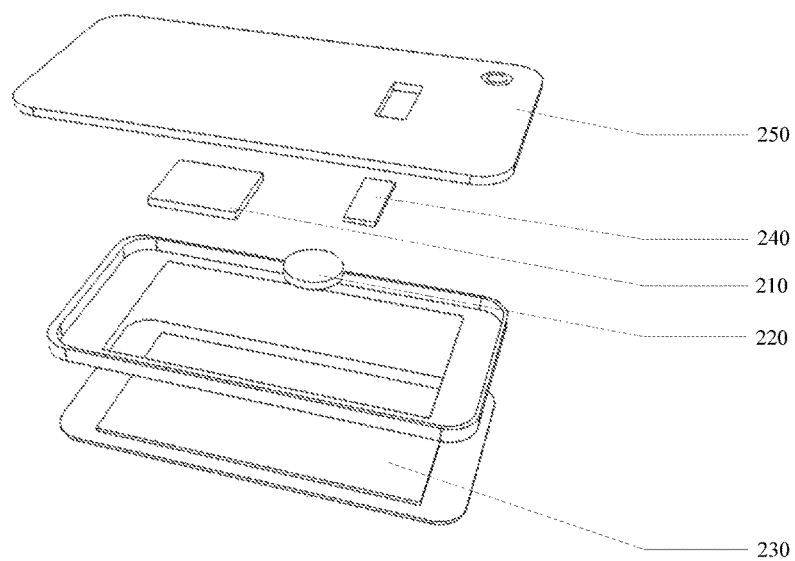
FIG. 2B is an exemplary block diagram of an electronic device according to an exemplary embodiment of the disclosure.

Sensors, such as the gravity sensor can sense the gravity applied to the electronic device, and determines the attitude of the electronic device according to the sensed gravity data. Thus, the electronic device can determine whether the electronic device is put upright or flatwise, whether its screen is facing upward or downward, or the like according to the sensed gravity data. Referring to FIG. 2B, the electronic device may include a control chip 210, a gravity sensor 220 and a screen 230. The gravity sensor 220 is disposed inside the electronic device, and the control chip 210 determines whether the screen 230 of the electronic device is downward based on the data collected by the gravity sensor 220.

In a second example, the electronic device has a front optical sensor such as a camera. The electronic device detects whether its screen is covered based on the data collected by the front optical sensor.

The optical sensor may be disposed on the screen side of the electronic device (not shown in the drawings), for example, in the periphery of the screen of the electronic device. The optical sensor can sense the light intensity substantially in front of the screen 230. When the control chip 210 detects that the light intensity is below a predetermined threshold value, it is determined that the screen 230 is covered. The predetermined threshold value may be a fixed value close to 0. Furthermore, the predetermined threshold value may change at different times. For example, the predetermined threshold value is set to be relatively higher in the daytime, and set to be relatively lower at night.

In a third example, the electronic device has a front distance sensor. The electronic device detects whether its screen is covered based on the data collected by the front distance sensor.

The distance sensor may be disposed on the screen side of the electronic device (not shown in the drawings), which is capable of detecting a distance between the screen 230 and an object in front of the screen 230, and generate a distance value accordingly. The control chip 210 may detect whether the screen 230 is covered based on the data collected by the front distance sensor.

In practical applications, one or more of the gravity sensor, the optical sensor and the distance sensor may be selectively built into the electronic device. Thus, the method of the embodiments of the disclosure may detect whether the screen of the electronic device is in the unobservable state based on one or more of the data collected by such sensors.

In Step 204, if it is detected that the screen is in the unobservable state, the electronic device further detect the type of the received message. There may be several types of messages, including but not limited to, call, SMS, MMS, E-mail, information and prompt.

The message is classified in advance by the control chip 210, for example. When it is detected that the screen is in the unobservable state, the electronic device further detects the type of the received message.

In Step 205, the message notification assembly is controlled to generate a visual prompt corresponding to the type of the message. The visual prompt varies with the type of the received message.

With reference to FIG. 2B, the electronic device further includes a message notification assembly 240 which is disposed on the non-screen side of the electronic device. The non-screen side may be a rear cover 250 of the electronic device opposite to the front side of the electronic device, or a lateral side (not shown) of the electronic device adjacent to the front side. After detecting the type of the message, the control chip 210 controls the message notification assembly 240 to generate the visual prompt corresponding to the type of the message. The visual prompt may be a flash light, a continuous light or the like. As shown in Table 1 below, different types of messages correspond to different visual prompts, respectively.

TABLE 1

| | Type of Message | Visual Prompt |
|---|---|---|
| 1 | Call | Red light flashes frequently |
| 2 | SMS | Blue light flashes intermittently |
| 3 | MMS | Blue light lights continuously |
| 4 | E-mail | Green light flashes frequently |
| 5 | Information | Blue light flashes frequently |
| 6 | Prompt | Green light flashes intermittently |
| . . . | . . . | . . . |

The message notification assembly 240 may be implemented by a light emitting diode (LED) or a flashlight of a rear camera of the electronic device. When the message notification assembly 240 is implemented by the LED, the LED may be combined with a logo (product or company logos, trademarks or the like) on the rear cover 250 of the electronic device. The implementation has attractive appearance and is low cost. When the message notification assembly 240 is implemented by the flashlight of the rear camera, the visual prompt may be in form of flashing of the flashlight to notify the user that the message is received. Furthermore, the relationships in the above-described Table 1 are exemplary only, and in practical applications, the types of messages can be correlated with different visual prompts according to the actual requirements.

In particular, if more than one message is received, the message notification assembly 240 is controlled to sequentially issue the visual reminding information corresponding to the types of respective received messages based on the predefined priority of each message. For example, the priority of the call is set to be 1 in advance, and the priority of the SMS is set to be 2 in advance. When receiving both messages of the call and SMS, the message notification assembly 240 is firstly controlled to issue the visual reminding information of red light flickering frequently, then the message notification assembly 240 is controlled to generate the visual prompt of blue light flash intermittently.

Alternatively, if more than one message is received, the message notification assembly 240 is controlled to sequentially generate the visual prompts corresponding to the respective received messages based on the order of receiving the messages. For example, when two SMS and one E-mail are received, the message notification assembly 240 is firstly controlled to generate the visual prompt of blue light flash intermittently, then the message notification assembly 240 is controlled to generate the visual prompt of blue light flash intermittently. Afterwards, the message notification assembly 240 is controlled to generate the visual prompt of green light flash frequently.

In summary, the message notification method according to the present embodiment detects whether the screen of the electronic device is in the unobservable state when receiving the message. If it is detected that the screen is in the unobservable state, the message notification assembly configured at the non-screen side of the electronic device is controlled to generate and display the visual prompt. Therefore, the problem existing in the related art, i.e. that the user can not be notified to read or answer the received messages when the electronic device is in the silent mode and the screen is in the unobservable state, can be solved.

The message notification method according to the present embodiment also detects the types of the received messages, and controls the message notification assembly to generate different visual prompts according to the types of the messages, such that the user knows what the received message is based on the visual prompts. In addition, the message notification assembly can be combined with the logo of the electronic device, thereby achieving an attractive appearance and low cost.

The following describes message notification devices according to embodiments of the present disclosure, which may be used to apply the method embodiments of the present disclosure. For the details not disclosed in the device embodiments of the present disclosure, the method embodiments of the present disclosure may be referred to.

Figure 3:
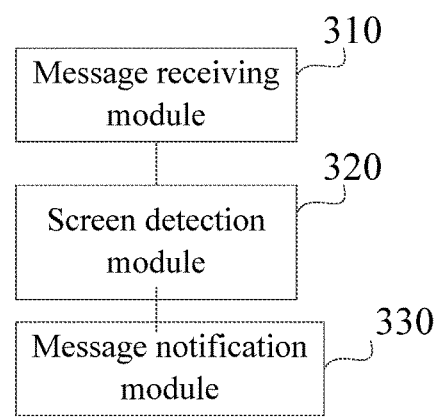
FIG. 3 is an exemplary block diagram of a message notification device according to an exemplary embodiment of the disclosure.

Referring to FIG. 3, which illustrates an exemplary block diagram of a message notification apparatus according to an embodiment of the present disclosure. The message notification apparatus may constitute a part of an electronic device by software, hardware or the combination thereof. The electronic device has a screen side with a screen and a non-screen side with a message notification assembly. The non-screen side is opposite to or adjacent to the screen side. The message notification apparatus may include a message receiving module 310, a screen detection module 320 and a message notification module 330.

The message receiving module 310 is configured to receive a message.

The screen detection module 320 is configured to detect whether the screen of the electronic device is in an unobservable state when the message is received, the unobservable state indicating that the screen of the electronic device is downward or covered.

The message notification module 330 is configured to control the message notification assembly to generate a visual prompt if the screen of the electronic device is in the unobservable state.

In summary, the message notification apparatus according to the present embodiment detects whether the screen of the electronic device is in the unobservable state when receiving the message. If it is detected that the screen is in the unobservable state, the message notification assembly configured at the non-screen side of the electronic device is controlled to generate and display the visual prompt. Therefore, the problem existing in the related art, i.e. that the user can not be notified to read or answer the received messages when the electronic device is in the silent mode and the screen is in the unobservable state, can be solved.

Figure 4:
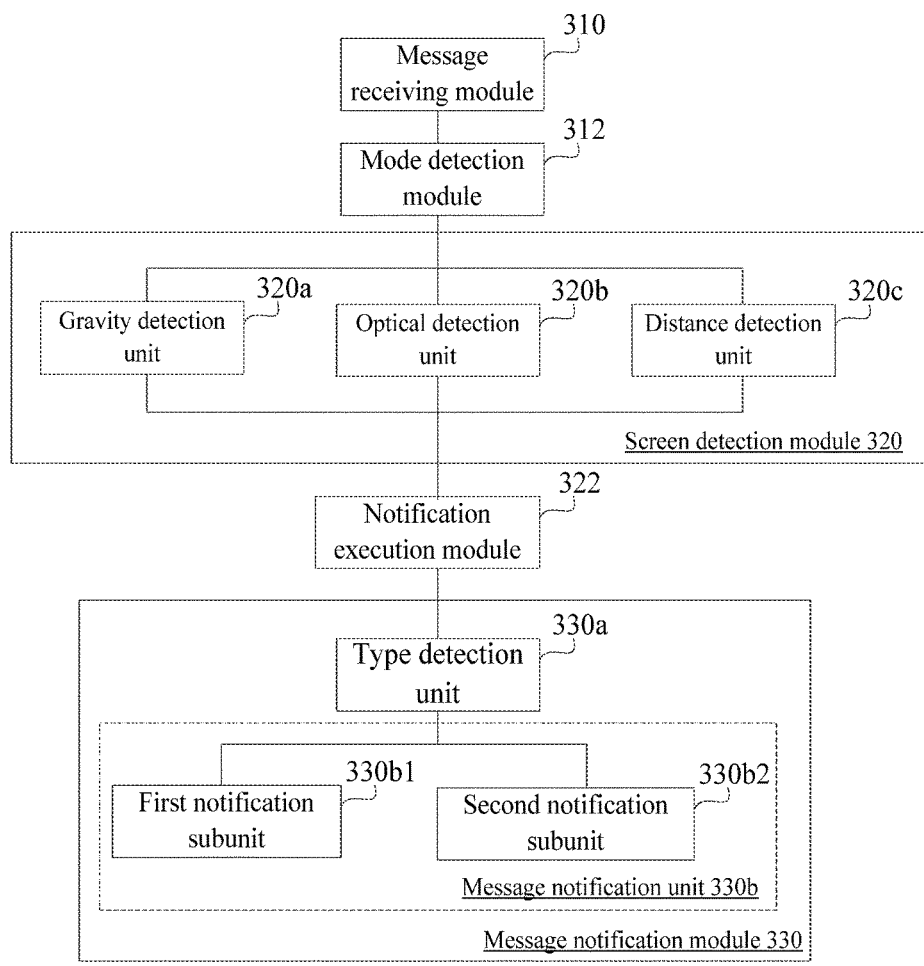
FIG. 4 is an exemplary block diagram of a message notification apparatus according to an exemplary embodiment of the disclosure.

Referring to FIG. 4, which illustrates an exemplary block diagram of a message notification apparatus according to another embodiment of the present disclosure. The message notification apparatus may constitute a part of an electronic device by software, hardware or the combination thereof. The electronic device has a screen side with a screen and a non-screen side with a message notification assembly. The non-screen side is opposite to or adjacent to the screen side. The message notification apparatus may include a message receiving module 310, a mode detection module 312, a screen detection module 320, a notification execution module 322 and a message notification module 330.

The message receiving module 310 is configured to receive a message.

The mode detection module 312 is configured to detect whether the electronic device is in a silent mode.

The screen detection module 320 is configured to detect whether the screen of the electronic device is in an unobservable state when the message is received, the unobservable state indicating that the screen of the electronic device is downward or covered.

For example, the screen detection module 320 includes a gravity detection unit 320a, or an optical detection unit 320b, and/or a distance detection unit 320c.

The gravity detection unit 320a is configured to detect whether the screen of the electronic device is downward based on data collected by a built-in gravity sensor.

The optical detection unit 320b is configured to detect whether the screen of the electronic device is covered based on data collected by a front optical sensor.

The distance detection unit 320c is configured to detect whether the screen of the electronic device is covered based on data collected by a front distance sensor.

The notification execution module 322 is configured to execute the step of controlling the message notification assembly to generate the visual prompt, if it is detected that the electronic device is in the silent mode and the screen of the electronic device is in the unobservable state.

The message notification module 330 is configured to control the message notification assembly to generate the visual prompt.

When the message notification assembly is a LED, the message notification module 330 is configured to control the LED to flash or to light continuously.

When the message notification assembly is a logo, the message notification module 330 is configured to control the logo to flash or to light continuously.

When the message notification assembly is a flashlight, the message notification module 330 is configured to control the flashlight to flash or to light continuously.

In some examples, the message notification module 330 includes a type detection unit 330a and a message notification unit 330b.

The type detection unit 330a is configured to detect a type of the message, and the type of the message includes any one of a call, a SMS, a MMS, an E-mail, information, and a prompt.

The message notification unit 330b is configured to control the message notification assembly to generate the visual prompt corresponding to the type of the message, the visual prompt varying with the type of the message.

The message notification unit 330b further includes a first notification subunit 330b1, or a second notification subunit 330b2.

The first notification subunit 330b1 is configured to, if more than one messages are received, control the message notification assembly to sequentially generate more than one visual prompts corresponding to the types of the received messages based on predefined priorities of the received messages.

The second notification subunit 330b2 is configured to, if more than one messages are received, control the message notification assembly to sequentially generate visual prompts corresponding to the types of the received messages based on a receiving order of the received messages.

In summary, the message notification apparatus according to the present embodiment detects whether the screen of the electronic device is in the unobservable state when receiving the message. If it is detected that the screen is in the unobservable state, the message notification assembly configured at the non-screen side of the electronic device is controlled to generate and display the visual prompt. Therefore, the problem existing in the related art, i.e. that the user can not be notified to read or answer the received messages when the electronic device is in the silent mode and the screen is in the unobservable state, can be solved.

The message notification apparatus according to the present embodiment also detects the types of the received messages, and controls the message notification assembly to generate different visual prompts according to the types of the messages, such that the user knows what the received message is based on the visual prompts. In addition, the message notification assembly can be combined with the logo of the electronic device, thereby achieving an attractive appearance and low cost.

It should be noted that the message notification apparatuses according to the above embodiments are only exemplarily divided into the above functional modules when conducting the message notification. In actual applications, the above functions may be achieved by different functional modules according to requirements. In other words, the device may be divided into different functional modules for achieving all or a part of the above described functions. In addition, the message notification apparatus according to the above embodiments and the method embodiments of the message notification method belong to the same concept, and the detailed implementing procedures of the message notification apparatus may be referred to the method embodiments, which will not be elaborated herein.

Another embodiment of the present disclosure provides an electronic device which may include: a screen side with a screen; a non-screen side with a message notification assembly, the non-screen side being opposite to or adjacent to the screen side; one or more processors; a memory for storing instructions executable by the one or more processors; and wherein the one or more processors are configured to execute instructions for: receiving a message; detecting whether the screen of the electronic device is in an unobservable state when the message is received, the unobservable state indicating that the screen of the electronic device is downward or covered; and controlling the message notification assembly to generate a visual prompt if the screen of the electronic device is in the unobservable state.

In one exemplary example, detecting whether the screen of the electronic device is in the unobservable state comprises: detecting whether the screen of the electronic device is downward based on data collected by a built-in gravity sensor of the electronic device; detecting whether the screen of the electronic device is obscured based on data collected by a front optical sensor of the electronic device; or detecting whether the screen of the electronic device is obscured based on data collected by a front distance sensor.

In one exemplary example, controlling the message notification assembly to generate the visual prompt comprises: detecting a type of the message, the type of the message comprising any one of a call, a SMS, a MMS, an E-mail, information and a prompt; and controlling the message notification assembly to generate the visual prompt corresponding to the type of the message, the visual prompt varying with the type of the message.

In one exemplary example, controlling the message notification assembly to generate the visual prompt according to the type of the message comprises: if more than one messages are received, controlling the message notification assembly to sequentially generate more than one visual prompts corresponding to the types of the received messages based on predefined priorities of the received messages; or if more than one messages are received, controlling the message notification assembly to sequentially generate visual prompts corresponding to the types of the received messages based on a receiving order of the received messages.

In one exemplary example, the message notification assembly comprises a LED, a logo or a flashlight, and controlling the message notification assembly to generate the visual prompt comprises controlling the message notification assembly to flash or to light continuously.

In one exemplary example, controlling the message notification assembly to generate the visual prompt further comprises: detecting whether the electronic device is in a silent mode; and controlling the message notification assembly to generate a visual prompt if the electronic device is in the silent mode and the screen of the electronic device is in the unobservable state.

Yet another embodiment of the present disclosure provides a non-transitory computer-readable storage medium having stored therein instructions that, when executed by one or more processors of an electronic device, cause the electronic device to perform: receiving a message by an electronic device having a screen side with a screen and a non-screen side with a message notification assembly, the non-screen side being opposite to or adjacent to the screen side; detecting whether the screen of the electronic device is in an unobservable state when the message is received, the unobservable state indicating that the screen of the electronic device is downward or covered; and controlling the message notification assembly to generate a visual prompt if the screen of the electronic device is in the unobservable state.

Figure 5:
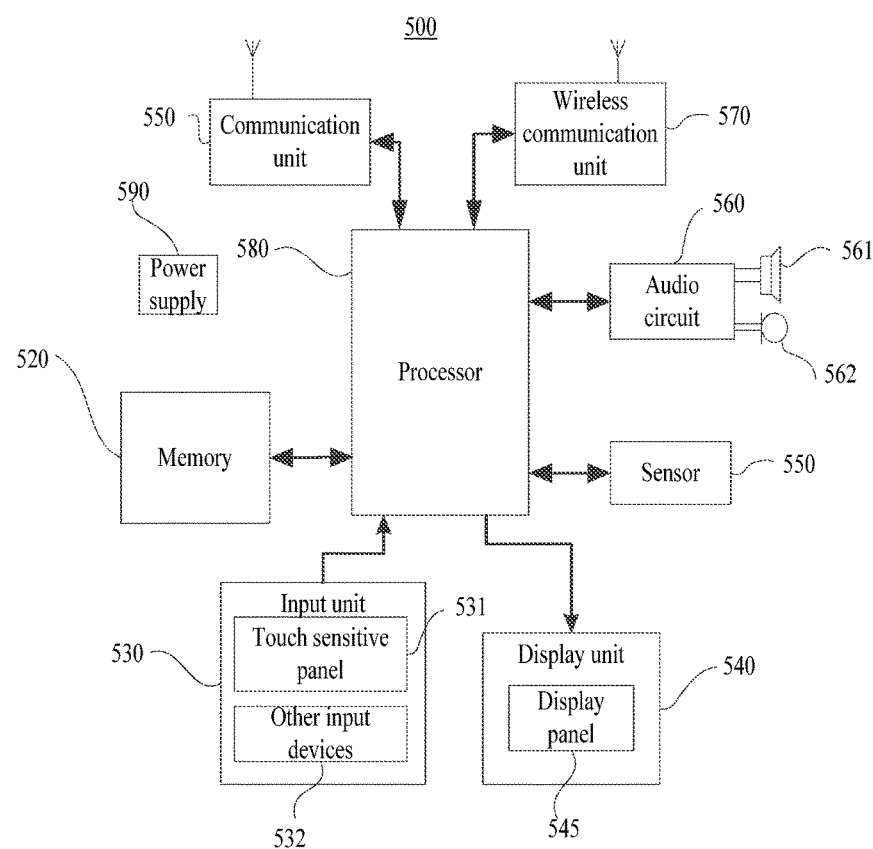
FIG. 5 is an exemplary block diagram of an electronic device for applying the method or device of the embodiments of the disclosure.

Referring to FIG. 5, which illustrates an exemplary block diagram of the electronic device used in embodiments of the present disclosure. The electronic device may be configured to implement the message notification methods according to the above embodiments.

The electronic device 500 may include a message notification assembly 502, a communication unit 510, a memory 520 including one or more computer-readable storage mediums, an input unit 530, a display unit 540, a sensor 550, an audio circuit 560, a wireless communication unit 570, a processor 580 including one or more processing cores, a power supply 590 and the like. The person skilled in the art could appreciate that the structure of the electronic device shown in the drawing does not constitute the limitation to the electronic device, but may include more or less components than those shown in the drawing, or may combine some of the components, or may have different arrangement of the components.

The message notification assembly 502 is configured at one side of the electronic device which does not have a screen. The message notification assembly 502 may be implemented by a LED or a flashlight of a rear camera of the electronic device 500. When the message notification assembly 502 is implemented by the LED, the LED may be combined with a logo (product or company logo, trademarks) on the rear cover of the electronic device 500. The message notification assembly 502 is configured to generate a visual prompt to notify the user to receive messages.

The communication unit 510 is configured to receive and transmit signals during information receipt and transmission or during a call. The communication unit 510 may be a RF (radio frequency) circuit, a router, a modem, or other network communication device. Specifically, in the case that the communication unit 510 is the RF circuit, after receiving the downlink information from the base station, the one or more processors 580 processes the downlink information; additionally, the uplink data is transmitted to the base station. Generally, the RF circuit serving as the communication unit includes, but is not limited to an antenna, at least one amplifier, a tuner, one or more oscillators, a subscriber identity module (SIM) card, a transceiver, a coupler, a LNA (Low Noise Amplifier), a duplexer, etc. Additionally, the communication unit 510 may also communicate with network and other devices via wireless communication. The wireless communication may adopt any communication standards or protocols, including but not limited to GSM (Global System of Mobile communication), GPRS (General Packet Radio Service), CDMA (Code Division Multiple Access), WCDMA (Wideband Code Division Multiple Access), LTE (Long Term Evolution), E-mail, SMS (Short Messaging Service), etc. The memory 520 may be configured to store software programs and modules, and the processor 580 performs various functional applications and data processing by executing the software programs and modules stored in the memory 520. The memory 520 may mainly include a program storage region and a data storage region, wherein the program storage region may store an operation system, an application program required by at least one function (such as an audio playing function, an image playback function) and the like; and the data storage region may store the data created according to the usage of the electronic device 500 (such as audio data, a phone book) and the like. In addition, the memory 520 may include a high-speed random access memory, and may also include a non-transitory memory, such as at least one disc storage device, flash device or other transitory solid-state storage device. Accordingly, the memory 520 may also include a memory controller for providing the processor 580 and the input unit 530 with an access to the memory 520.

The input unit 530 may be configured to receive the input digits or character information, and generate signal inputs of a keyboard, a mouse, a joystick or a trackball related to the user settings and function control. For example, the input unit 530 may include a touch sensitive surface 531 and other input devices 532. The touch sensitive surface 531, which is also referred to as a touch screen or a touch pad, can collect the user's touch operation thereon or thereabout (for example, the user performs operations on the touch sensitive surface 531 or near the touch sensitive surface 531 by using fingers, a stylus, or any suitable object or accessory), and drive the corresponding connected device according to the preset program. Optionally, the touch sensitive surface 531 may include two parts, i.e., a touch detection device and a touch controller, wherein the touch detection device detects a touch orientation of the user and signals caused by the touch operation, and transmits the signals to the touch controller; and the touch controller receives the touch information from the touch detection device, converts the touch information into a contact coordinate and transmits it to the processor 580, and the touch controller can also receive the instruction from the processor 580 and execute the instruction. Additionally, the touch sensitive surface 531 may be achieved by adopting various types, such as a resistive type, a capacitive type, an infrared ray type, and a surface acoustic wave type. Besides the touch sensitive surface 531, the input unit 530 may also include other input device 532. For example, the other input device 532 may include but not limited to one or more of a physical keyboard, a function key (such as a volume control key, a switch key), a trackball, a mouse and a joystick.

The display unit 540 may be configured to display information input by the user or information provided to the user and various kinds of graphical user interfaces of the electronic device 500, and the graphical user interfaces may be constituted by a graphic, a text, an icon, a video and any combination thereof. The display unit 540 may include a display panel 541. Optionally, the display panel 541 may be configured in the form of a LCD (Liquid Crystal Display), an OLED (Organic Light-Emitting Diode) and the like. Further, the touch sensitive surface 531 may cover the display panel 541. When the touch operation on or near the touch sensitive surface 531 is detected, the touch sensitive surface 531 transmits the touch operation to the processor 580 to determine the type of the touch event, and then the processor 580 provides a corresponding visual output on the display panel 541 according to the type of the touch event. Although in FIG. 5, the touch sensitive surface 531 and the display panel 541 act as two independent components to achieve input and output functions, in some embodiments, the touch sensitive surface 531 and the display panel 541 may be integrated to achieve the input and output functions.

The electronic device 500 may further include at least one sensor 550 such as an optical sensor, a distance sensor, a gravity sensor and other sensors. The optical sensor detects whether the screen of the electronic device 500 is in the obscured state. In addition, the optical sensor may include an ambient light sensor and a proximity sensor, wherein the ambient light sensor may adjust the brightness of the display panel 541 according to the light and shade of the ambient light, and the proximity sensor may turn off the display panel 541 and/or the backlight when the electronic device 500 is moved to the ear. The gravity sensor detects whether the screen of the electronic device 500 is facing down. The gravity sensor may also detect the magnitude of the acceleration along respective directions (in general, three axes), may detect the magnitude and direction of the gravity when being stationary, and may be used in the applications which identify the attitudes of the mobile phone (such as a horizontal and vertical screen switching, a relevant game, a magnetometer attitude calibration) and functions relevant to vibration identification (such as a pedometer, a percussion) and the like. The electronic device 500 may also be configured with a gyroscope, a barometer, a hygrometer, a thermometer, an infrared sensor and other sensors, which are not repeated herein.

The audio circuit 560, a speaker 561 and a microphone 562 may provide the audio interfaces between the user and the electronic device 500. The audio circuit 560 may transmit an electrical signal converted from the received audio data to the speaker 561, and the speaker 561 converts the electrical signal into an acoustical signal and outputs it. On the other hand, the microphone 562 converts the collected acoustical signal into an electrical signal, the audio circuit 560 receives the electrical signal, converts it into audio data, and outputs the audio data to the processor 580 for processing, then the processed audio data is for example transmitted to another electronic device via the RF circuit 510, or the audio data is output to the memory 520 for further processing. The audio circuit 560 may also include a receiver jack for providing the communication between the peripheral headphone and the electronic device 500.

In order to achieve the wireless communication, the wireless communication unit 570 may be provided on the electronic device. The wireless communication unit 570 may be a WIFI module. The WIFI belongs to the short-range wireless transmission technology. The electronic device 500 may assist the user to send and receive E-mails, browse the web, access the streaming media and the like via the wireless communication unit 570, and provide the user with the wireless broadband Internet access. Although the wireless communication unit 570 is shown in the drawing, it may be appreciated that the wireless communication unit 570 is not a necessary constitution of the electronic device 500, and can be omitted according to requirements without changing the essential scope of the invention.

The processor 580 is a control center of the electronic device 500. The processor 580 connects respective parts of the entire mobile phone via various interfaces and wirings, and performs various functions of the electronic device 500 and processes data so as to wholly monitor the mobile phone, by running or executing the software programs and/or modules within the memory 520 and calling the data stored in the memory 520. Optionally, the processor 580 may include one or more processing cores. For example, the processor 580 may integrate with the application processor and the modem processor, wherein the application processor mainly processes the operation system, the user interface, the application program, etc., and the modem processor mainly processes the wireless communication. It may be appreciated that the modem processor may not be integrated into the processor 580.

The electronic device 500 further includes a power supply 590 (such as a battery) for supplying power to respective components. For example, the power supply may be connected to the processor 580 logically via a power management system, so as to achieve the functions of a charge management, a discharge management and a power consumption management by the power management system. The power supply 590 may also include any components, such as one or more direct current or alternative current power supplies, recharging systems, power failure detection circuits, power converters or inverters, and power status indicators.

Although not shown in the drawing, the electronic device 500 may also include a camera, a Bluetooth module, and the like, which are not repeated herein. In the present embodiment, the electronic device further includes a memory and one or more programs stored in the memory. The one or more processors executing the one or more programs include performing the instructions involved in the message notification method provided by the embodiment shown in FIG. 1 or FIG. 2A of the present disclosure.

In addition, typically, the electronic device described in the present disclosure may be various handheld terminals, such as a mobile phone, and a personal digital assistant (PDA), etc. Thereby, the protection scope of the present disclosure should not be restricted to any specific type of the electronic device.

Additionally, the method according to the present disclosure may be implemented as the computer program executed by CPU, and the computer program may be stored in the computer-readable storage medium. When the computer program is executed by the CPU, the above functions defined in the method of the present disclosure are performed.

Furthermore, the above steps in the method and the units in the system may also be realized by using the controller and the computer-readable storage medium which stores the computer program for causing the controller to achieve the above steps or unit functions.

Moreover, it should be understood that the computer-readable storage medium (such as the memory) described in the present disclosure may be a transitory or non-transitory memory, or a combination thereof. As an example and not restrictive, the non-transitory memory may include a read-only memory (ROM), a programmable ROM (PROM), an electrically programmable ROM (EPROM), an electrically erasable programmable ROM (EEPROM), or a flash memory. The transitory memory may include a random access memory (RAM) which can act as an external cache memory. As an example and not restrictive, RAM may be obtained in various forms, such as a synchronous RAM (DRAM), a dynamic RAM (DRAM), a synchronous DRAM (SDRAM), a double data rate SDRAM (DDR SDRAM), an enhanced SDRAM (ESDRAM), a synchronization link DRAM (SLDRAM), and a direct RambusRAM (DRRAM). The storage devices in the aspects of the present disclosure are intended to include, but not limited to, these and any other suitable types of memory.

The person skilled in the art should also understand that the various illustrative logical blocks, modules, circuits and algorithm steps described in combination with the contents disclosed herein may be implemented as an electronic hardware, computer software or a combination thereof. In order to clearly explain the interchangeability between the hardware and the software, a general description has been given in terms of the functions of various illustrative components, blocks, modules, circuits and steps. These functions are implemented as the software or implemented as the hardware depending on the particular applications and the design constraints imposed to the whole system. The person skilled in the art may realize these functions in various manners with respect to each kind of particular application, but this realization should not be interpreted as departing from the scope of the present disclosure.

The various illustrative logical blocks, modules and circuits described in combination with the contents disclosed herein may be realized or executed by the following components which are designed for executing the above functions: a general purpose processor, a digital signal processor (DSP), an application specific IC (ASIC), a field programmable gate array (FPGA), or other programmable logic devices, a discrete gate, or a transistor logic, a discrete hardware element or any combination thereof. The general purpose processor may be a microprocessor. Alternatively, the processor may be any conventional processor, controller, microcontroller or state machine. The processor may also be implemented as a combination of the computing devices, such as a combination of a DSP and a microprocessor, a plurality of microprocessors, one or more microprocessor combined with a DSP core, or any other such configurations.

The steps of the method or algorithm described in combination with the contents disclosed herein may be directly included in the hardware, in the software module executed by the processor, or in a combination thereof. The software module may reside in a RAM, a flash memory, a ROM, an EPROM, an EEPROM, a register, a hard disk, a removable disk, a CD-ROM, or any other storage mediums of any forms known in the art. The exemplary storage medium is coupled to the processor such that the processor can read information from the storage medium or write information into the storage medium. In an alternative solution, the storage medium may be integrated to the processor. The processor and the storage medium may reside in an ASIC. The ASIC may reside in a user terminal. In an alternative solution, the processor and the storage medium may reside in the user terminal as discrete components.

In one or more exemplary designs, the functions may be implemented in hardware, software, firmware, or any combination thereof. If the functions are implemented in software, the functions may be stored in the computer-readable storage medium or may be transmitted by the computer-readable medium as one or more instructions or codes. The computer-readable medium includes a computer storage medium and a communication medium, and the communication medium includes any medium assisting the transmission of the computer program from one place to another place. The storage medium may be any available medium which is able to be accessed by a general purpose or special purpose computer. As an example and not restrictive, the computer-readable medium may include a RAM, a ROM, an EEPROM, a CD-ROM or other optical disc storage devices, magnetic disc storage devices or other magnetic storage devices, or may be any other media which are used to carry or store the desired program codes in the form of instructions or data structures and can be accessed by a general purpose or special purpose computer or a general purpose or special purpose processor. Also, any linking may be properly referred to as the computer-readable medium. For example, if sending the software from a website, a server, or other remote sources by a coaxial cable, a fiber optic cable, a twisted pair, a digital subscriber line (DSL), or a wireless technology such as an infrared, a radio and a microwave technologies, the above coaxial cable, fiber optic cable, twisted pair, DSL, or wireless technology such as the infrared, the radio and the microwave technologies are included in the definition of the media. As used herein, the magnetic disc and the optical disc include a compact disc (CD), a laser disc, an optical disc, a digital versatile disc (DVD), a floppy disc and a blu-ray disc, wherein the magnetic disc usually reproduces data magnetically, while the optical disc reproduces data optically with lasers. The combinations of the above contents should also be included within the scope of the computer-readable medium.

Although the exemplary embodiments of the present disclosure are illustrated in the above contents, it should be noted that various changes and modifications may be made to the disclosed exemplary embodiments without departing from the scope of the present disclosure as defined in the claims. The functions, steps and/or actions in the method claim according to the disclosed embodiments described herein need not be performed in any specific order. In addition, although the elements of the present disclosure may be described or claimed in the individual form, they can also be conceived to be more unless they are explicitly restricted to be singular.

It should be understood that in the present disclosure, unless the exceptional case in which the context clearly gives supports, the singular forms "a", "an", and "the" are intended to include the plural forms. It should also be appreciated that the expression "and/or" used herein indicates including any and all possible combinations of one or more of the associated listed items.

The serial numbers of the aforementioned embodiments in the present disclosure are only for illustrative purpose, not showing the superiority or inferiority of the embodiments.

The person skilled in the art can understand that the whole or part of the steps for achieving the above-described embodiments can be accomplished by hardware, or be accomplished by a program instructing relevant hardware, the program may be stored in a computer readable storage medium, and the above-mentioned storage medium may be a read-only memory, a magnetic disc or an optical disc, etc.

The above contents are only exemplary embodiments of the present disclosure, but are not intended to limit the present disclosure. Any modifications, equivalent replacements, improvements and the like made within the spirit and principles of the present disclosure should be included in the protection scope of the present disclosure.

What is claimed is:

1. A message notification method, comprising:
   receiving a message by an electronic device;
   detecting whether a screen of the electronic device is in an unobservable state when the message is received, the unobservable state indicating that the screen of the electronic device is downward or covered based on gravity of the electronic device, light intensity in front of the screen, and a distance between the screen and an object in front of the screen;
   detecting whether the electronic device is in a silent mode, wherein the silent mode is configured to be independent of the unobservable state; and
   controlling a message notification assembly configured at a non-screen side of the electronic device to generate a visual prompt and an audio prompt if the screen of the electronic device is in the unobservable state and the electronic device is in the silent mode.

2. The method according to claim 1, wherein detecting whether the screen of the electronic device is in the unobservable state comprises:
   detecting whether the screen of the electronic device is downward based on data collected by a built-in gravity sensor of the electronic device;
   detecting whether the screen of the electronic device is obscured based on data collected by a front optical sensor of the electronic device; or
   detecting whether the screen of the electronic device is obscured based on data collected by a front distance sensor.

3. The method according to claim 1, wherein controlling the message notification assembly to generate the visual prompt comprises:
   detecting a type of the message, the type of the message comprising any one of a call, a SMS, a MMS, an E-mail, information and a prompt; and
   controlling the message notification assembly to generate the visual prompt corresponding to the type of the message, the visual prompt varying with the type of the message.

4. The method according to claim 3, wherein controlling the message notification assembly to generate the visual prompt according to the type of the message comprises:
   if more than one messages are received, controlling the message notification assembly to sequentially generate more than one visual prompts corresponding to the types of the received messages based on predefined priorities of the received messages; or
   if more than one messages are received, controlling the message notification assembly to sequentially generate visual prompts corresponding to the types of the received messages based on a receiving order of the received messages.

5. The method according to claim 1, wherein the message notification assembly comprises a LED, a logo or a flashlight, and controlling the message notification assembly to generate the visual prompt comprises controlling the message notification assembly to flash or to light continuously.

6. An electronic device, comprising:
   a screen;
   one or more processors;
   a memory for storing instructions executable by the one or more processors; and
   wherein the one or more processors are configured to execute instructions for:
   receiving a message;
   detecting whether the screen of the electronic device is in an unobservable state when the message is received, the unobservable state indicating that the screen of the electronic device is downward or covered based on gravity data of the electronic device, light intensity in front of the screen, and a distance between the screen and an object in front of the screen;
   detecting whether the electronic device is in a silent mode, wherein the silent mode is configured to be independent of the unobservable state; and
   controlling a message notification assembly configured at a non-screen side of the electronic device to generate a visual prompt and an audio prompt if the screen of the electronic device is in the unobservable state and the electronic device is in the silent mode.

7. The electronic device according to claim 6, wherein detecting whether the screen of the electronic device is in the unobservable state comprises:
   detecting whether the screen of the electronic device is downward based on data collected by a built-in gravity sensor of the electronic device;
   detecting whether the screen of the electronic device is obscured based on data collected by a front optical sensor of the electronic device; or
   detecting whether the screen of the electronic device is obscured based on data collected by a front distance sensor.

8. The electronic device according to claim 6, wherein controlling the message notification assembly to generate the visual prompt comprises:
   detecting a type of the message, the type of the message comprising any one of a call, a SMS, a MMS, an E-mail, information and a prompt; and
   controlling the message notification assembly to generate the visual prompt corresponding to the type of the message, the visual prompt varying with the type of the message.

9. The electronic device according to claim 8, wherein controlling the message notification assembly to generate the visual prompt according to the type of the message comprises:
- if more than one messages are received, controlling the message notification assembly to sequentially generate more than one visual prompts corresponding to the types of the received messages based on predefined priorities of the received messages; or
- if more than one messages are received, controlling the message notification assembly to sequentially generate visual prompts corresponding to the types of the received messages based on a receiving order of the received messages.

10. The electronic device according to claim 6, wherein the message notification assembly comprises a LED, a logo or a flashlight, and controlling the message notification assembly to generate the visual prompt comprises controlling the message notification assembly to flash or to light continuously.

11. A non-transitory computer-readable storage medium having stored therein instructions that, when executed by one or more processors of an electronic device, cause the electronic device to perform:
- receiving a message by an electronic device;
- detecting whether a screen of the electronic device is in an unobservable state when the message is received, the unobservable state indicating that the screen of the electronic device is downward or covered based on gravity data of the electronic device, light intensity in front of the screen, and a distance between the screen and an object in front of the screen;
- detecting whether the electronic device is in a silent mode, wherein the silent mode is configured to be independent of the unobservable state; and
- controlling a message notification assembly configured at a non-screen side of the electronic device to generate a visual prompt and an audio prompt if the screen of the electronic device is in the unobservable state and the electronic device is in the silent mode.

12. The storage medium according to claim 11, wherein detecting whether the screen of the electronic device is in the unobservable state comprises:
- detecting whether the screen of the electronic device is downward based on data collected by a built-in gravity sensor of the electronic device;
- detecting whether the screen of the electronic device is obscured based on data collected by a front optical sensor of the electronic device; or
- detecting whether the screen of the electronic device is obscured based on data collected by a front distance sensor.

13. The storage medium according to claim 11, wherein controlling the message notification assembly to generate the visual prompt comprises:
- detecting a type of the message, the type of the message comprising any one of a call, a SMS, a MMS, an E-mail, information and a prompt; and
- controlling the message notification assembly to generate the visual prompt corresponding to the type of the message, the visual prompt varying with the type of the message.

14. The storage medium according to claim 13, wherein controlling the message notification assembly to generate the visual prompt according to the type of the message comprises:
- if more than one messages are received, controlling the message notification assembly to sequentially generate more than one visual prompts corresponding to the types of the received messages based on predefined priorities of the received messages; or
- if more than one messages are received, controlling the message notification assembly to sequentially generate visual prompts corresponding to the types of the received messages based on a receiving order of the received messages.

15. The storage medium according to claim 11, wherein the message notification assembly comprises a LED, a logo or a flashlight, and controlling the message notification assembly to generate the visual prompt comprises controlling the message notification assembly to flash or to light continuously.

* * * * *